(12) United States Patent
Tsai et al.

(10) Patent No.: US 10,628,229 B2
(45) Date of Patent: Apr. 21, 2020

(54) COMPOSING BY NETWORK ATTRIBUTES (71) Applicant: QUANTA COMPUTER INC., Taoyuan (TW)

(72) Inventors: Kun-Hu Tsai, Taoyuan (TW); Ching-Chih Shih, Taoyuan (TW); Yu-Cheng Hsu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 416 days.

(21) Appl. No.: 15/807,341

(22) Filed: Nov. 8, 2017

(65) Prior Publication Data
US 2019/0050268 A1 Feb. 14, 2019

Related U.S. Application Data (60) Provisional application No. 62/544,588, filed on Aug. 11, 2017.

(51) Int. Cl.
*G06F 9/50* (2006.01)
*H04L 12/24* (2006.01)
*H04L 12/26* (2006.01)
*H04L 29/08* (2006.01)

(52) U.S. Cl.
CPC .......... *G06F 9/5077* (2013.01); *G06F 9/5038* (2013.01); *G06F 9/5072* (2013.01); *H04L 41/0896* (2013.01); *H04L 41/12* (2013.01); *H04L 43/0811* (2013.01); *G06F 9/5083* (2013.01); *H04L 67/1004* (2013.01); *H04L 67/32* (2013.01)

(58) Field of Classification Search
CPC ..................................................... G06F 9/5077
See application file for complete search history.

(56) References Cited

U.S. PATENT DOCUMENTS

| 2013/0201829 | A1 | 8/2013 | Pacella |
| 2015/0163100 | A1 | 6/2015 | Graf et al. |
| 2015/0319083 | A1* | 11/2015 | Grosser, Jr. ............. H04L 41/12 370/218 |

FOREIGN PATENT DOCUMENTS

| JP | 2010063058 A | 3/2010 |
| JP | 2011517346 A | 6/2011 |
| JP | 2015023453 A | 2/2015 |

OTHER PUBLICATIONS

Kant, Krishna; Data center evolution: A tutorial on state of the art, issues, and challenges; Computer Networks, vol. 53; 2009; pp. 2939-2965; Elsevier B.V.

(Continued)

*Primary Examiner* — Nicholas P Celani
(74) *Attorney, Agent, or Firm* — Nixon Peabody LLP; Zhou Lu (57) ABSTRACT

The present disclosure provides a system and method for automatically composing resources in a data center using a management application. The management application can communicate with a data center management software to collect information of computer resource, storage resource, and network resource of the data center. Based at least upon the network resource information of the data center, the management application can generate a network topology of the data center. In response to receiving a request from a specific user, the management application can compose suitable resources of the data center to match the request.

20 Claims, 7 Drawing Sheets (56) References Cited

OTHER PUBLICATIONS

Extended European Search Report for EP Application No. 18156727.2, dated Jun. 26, 2018.
JP Office Action for Application No. 2018-040211, dated Nov. 27, 2018 w/ First Office Action Summary.

* cited by examiner

COMPOSING BY NETWORK ATTRIBUTES

CROSS-REFERENCE TO RELATED APPLICATIONS

This application claims priority to and the benefit of U.S. Provisional Application No. 62/544,588, entitled, "Compose by Network Attributes," and filed Aug. 11, 2017, the contents of which are hereby incorporated by reference in their entirety.

FIELD OF THE INVENTION

The present disclosure generally relates to server systems and more specifically, to network management.

BACKGROUND

Data center technology is becoming increasingly important in today's world. Not only are individual users utilizing their mobile devices and computers for entertainment and other needs, but corporations also depend on enterprise computing systems to carry out mission-critical tasks. All these applications and devices are supported mostly by data centers.

Data centers typically comprise three major components: servers, network, and storage devices. Further, data center management software is typically used to manage these components in the data centers. For example, data center management software receives requests from end users and then composes appropriate resources of the data center to service these requests. Composed resources may include computing capacity, memory and storage sizes, NIC (Network Interface Card) speed, and VLAN (Virtual Local Area Network) ID (Identification).

However, conventional data center management software, such as Intel® RSD (Rack Scale Design), require further improvements to better support requests from corporations and end users.

SUMMARY

Systems and methods in accordance with various examples of the present disclosure provide a solution to the above-mentioned problems by automatically composing resources in a data center using a management application. The management application can communicate with the data center management software of the data center to collect information on the computer, storage, and network resources of the data center. Based at least upon the network resource information of the data center, the management application can generate a network topology of the data center. In response to receiving a request from a specific user, the management application can compose suitable resources of the data center to match the request. For purposes of the present detailed description, the word "compose" or "composing" means "searching" a matched resource (e.g., computer, storage, or network resources), and "allocating" the matched resource for the specific user. In some implementations, the matched resource may not be accessible for other users until the matched resource is "de-composed."

In accordance with one aspect of the present disclosure, a computer-implemented method for composing data center resources in a data center, comprises: (1) causing a management software of the data center to collect connection status between a plurality of nodes and a plurality of switches in the data center, and among the plurality of switches; (2) receiving the connection status from the management software; (3) generating a network topology of the data center based upon the connection status; (4) patching a network name for each Ethernet interface of the plurality of nodes, in which a specific Ethernet interface of the plurality of nodes is patched with a name of a corresponding network connected to the specific Ethernet interface; (5) determining matched nodes among the plurality of nodes based upon the network name patched to each Ethernet interface of the plurality of nodes; (6) receiving a request from a user device of a user; and (7) composing resources of the data center to support the request based at least upon information of the matched nodes. In some examples, each of the plurality of nodes and the plurality of switches can collect corresponding neighbor information via a LLDP (Link Layer Discovery Protocol).

In some examples, the computer-implemented method further comprises: determining that the request has been satisfied; and decomposing the resources such that the resources are accessible for other users. In some examples, patching a network name for each Ethernet interface of the plurality of nodes further comprises updating a database field of the management software.

In some examples, attributes of computer resources in the data center comprise, but are not limited to, core, speed and manufacture information of CPUs (Central Processing Units), and memory's size and speed. Attributes of storage resources in the data center comprise, but are not limited to, storage types (e.g., SAS (Serial Attached SCSI), SATA (Serial At Attachment), or NVMe (Non-Volatile Memory Express)) and storage size. Attributes of network resources in the data center comprise, but are not limited to, VLAN (Virtual Local Area Network), and network bandwidth/speed.

In accordance with another aspect of the present disclosure, a computer-implemented method for composing data center resources in a data center, comprises: (1) causing a management software of the data center to collect connection status between a plurality of nodes and a plurality of switches in the data center, and among the plurality of switches; (2) receiving the connection status from the management software; (3) generating a network topology of the data center based upon the connection status; (4) determining two or more Ethernet interfaces of at least one node among the plurality of nodes that support MLAG (Multi-Chassis Link Aggregation Group) functionality; (5) updating the two or more Ethernet interfaces of the at least one node as "Supporting MLAG;" (6) receiving a request from a user device of a user; and (7) composing resources of the data center to support the request based at least upon information of the two or more Ethernet interfaces of the at least one node.

In some examples, two or more Ethernet interfaces of the at least one node are updated as "Supporting MLAG" via a HTTP (Hypertext Transfer Protocol) patch. The HTTP patch can be used to update partial resources (e.g., one field of the resources) in the data center.

In accordance with another aspect of the present disclosure, a computer-implemented method for composing data center resources in a data center, comprises: (1) causing a management software of the data center to collect connection status between a plurality of nodes and a plurality of switches in the data center, and among the plurality of switches; (2) receiving the connection status from the management software; (3) generating a network topology of the data center based upon the connection status; (4) patching a network name for each Ethernet interface of the plurality of nodes, in which a specific Ethernet interface of the plurality of nodes is patched with a name of a corresponding network connected to the specific Ethernet interface; (5) determining matched nodes among the plurality of nodes based upon the network name patched to each Ethernet interface of the plurality of nodes; (6) determining two or more Ethernet interfaces of at least one node among the plurality of nodes that support MLAG functionality; (7) updating the two or more Ethernet interfaces of the at least one node as "Supporting MLAG;" (8) determining at least another node of the plurality of nodes, two or more Ethernet interfaces of the at least another node connected to a single switch of the plurality of switches; (9) updating the two or more Ethernet interfaces of the at least another node as "Supporting LAG (Link Aggregation Group);" receiving a request from a user device of a user; and (10) composing resources of the data center to support the request based at least upon information of the matched nodes, information of the two or more Ethernet interfaces of the at least node, or information of the two or more Ethernet interfaces of the at least another node.

In some examples, the computer-implemented method for composing data center resources in the data center further comprises: composing the resources of the data center to support the request based at least upon network attributes including DCB (Data center Bridging).

For purposes of the present detailed description, the word "LAG" may also cover similar terms "Port Group" or "EtherChannel." For purposes of the present detailed description, the word "MLAG" may also cover similar terms "MC-LAG (Multi-Chassis Link Aggregation Group," or "VPC (Virtual Port Channel)."

In some examples, the two or more Ethernet interfaces of the at least node is updated as "Supporting MLAG" via a first HTTP patch, while the two or more Ethernet interfaces of the at least another node is updated as "Supporting LAG" via a second HTTP patch.

In accordance with another aspect of the present disclosure, a non-transitory computer-readable storage medium storing instructions is provided. When the instructions are executed by a processor, they cause the processor to perform operations that include: (1) causing a management software of the data center to collect connecting status between a plurality of nodes and a plurality of switches in the data center, and among the plurality of switches; (2) receiving the connection status from the management software; (3) generating a network topology of the data center based upon the connection status; (4) patching a network name for each Ethernet interface of the plurality of nodes, in which a specific Ethernet interface of the plurality of nodes is patched with a name of a corresponding network connected to the specific Ethernet interface; (5) determining matched nodes among the plurality of nodes based upon the network name patched to each Ethernet interface of the plurality of nodes; (6) receiving a request from a user device of a user; and (7) composing resources of the data center to support the request based at least upon information of the matched nodes.

In accordance with another aspect of the present disclosure, a non-transitory computer-readable storage medium storing instructions is provided. When the instructions are executed by a processor, they cause the processor to perform operations that include: (1) causing a management software of the data center to collect connection status between a plurality of nodes and a plurality of switches in the data center, and among the plurality of switches; (2) receiving the connection status from the management software; (3) generating a network topology of the data center based upon the connection status; (4) determining two or more Ethernet interfaces of at least one node among the plurality of nodes that support MLAG (Multi-Chassis Link Aggregation Group) functionality; (5) updating the two or more Ethernet interfaces of the at least one node as "Supporting MLAG;" (6) receiving a request from a user device of a user; and (7) composing resources of the data center to support the request based at least upon information of the two or more Ethernet interfaces of the at least one node.

In accordance with another aspect of the present disclosure, a non-transitory computer-readable storage medium storing instructions is provided. When the instructions are executed by a processor, they cause the processor to perform operations that include: (1) causing a management software of the data center to collect connection status between a plurality of nodes and a plurality of switches in the data center, and among the plurality of switches; (2) receiving the connection status from the management software; (3) generating a network topology of the data center based upon the connection status; (4) patching a network name for each Ethernet interface of the plurality of nodes, in which a specific Ethernet interface of the plurality of nodes is patched with a name of a corresponding network connected to the specific Ethernet interface; (5) determining matched nodes among the plurality of nodes based upon the network name patched to each Ethernet interface of the plurality of nodes; (6) determining two or more Ethernet interfaces of at least one node among the plurality of nodes that support MLAG functionality; (7) updating the two or more Ethernet interfaces of the at least one node as "Supporting MLAG;" (8) determining at least another node of the plurality of nodes, two or more Ethernet interfaces of the at least another node connected to a single switch of the plurality of switches; (9) updating the two or more Ethernet interfaces of the at least another node as "Supporting LAG (Link Aggregation Group);" receiving a request from a user device of a user; and (10) composing resources of the data center to support the request based at least upon information of the matched nodes, information of the two or more Ethernet interfaces of the at least node, or information of the two or more Ethernet interfaces of the at least another node.

In some examples, the management applicant is used to update the two or more Ethernet interfaces of the at least another node as "Supporting LAG." In some examples, the management software checks the connecting status of the two or more Ethernet interfaces of the at least another node.

Additional features and advantages of the disclosure will be set forth in the description which follows, and in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof, which are illustrated in the appended drawings. These drawings depict only example aspects of the disclosure, and are not therefore to be considered to be limiting of its scope. The principles herein are described and explained with additional specificity and detail through the use of the accompanying drawings in which.

DETAILED DESCRIPTION

The present disclosure can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed: the singular includes the plural and vice versa; and the word "including" means "including without limitation." Moreover, words of approximation, such as "about," "almost," "substantially," "approximately," and the like, can be used herein to mean "at, near, or nearly at," or "within 3-5% of," or "within acceptable manufacturing tolerances," or any logical combination thereof, for example.

Various examples of the present disclosure provide methods for automatically composing resources in a data center using a management application. The management application can communicate with a data center management software to collect information of computer resource, storage resource, and network resource of the data center. Based at least upon the network resource information of the data center, the management application can generate a network topology of the data center. In response to receiving a request from a specific user, the management application can compose suitable resources of the data center to match the request.

Figure 1A:
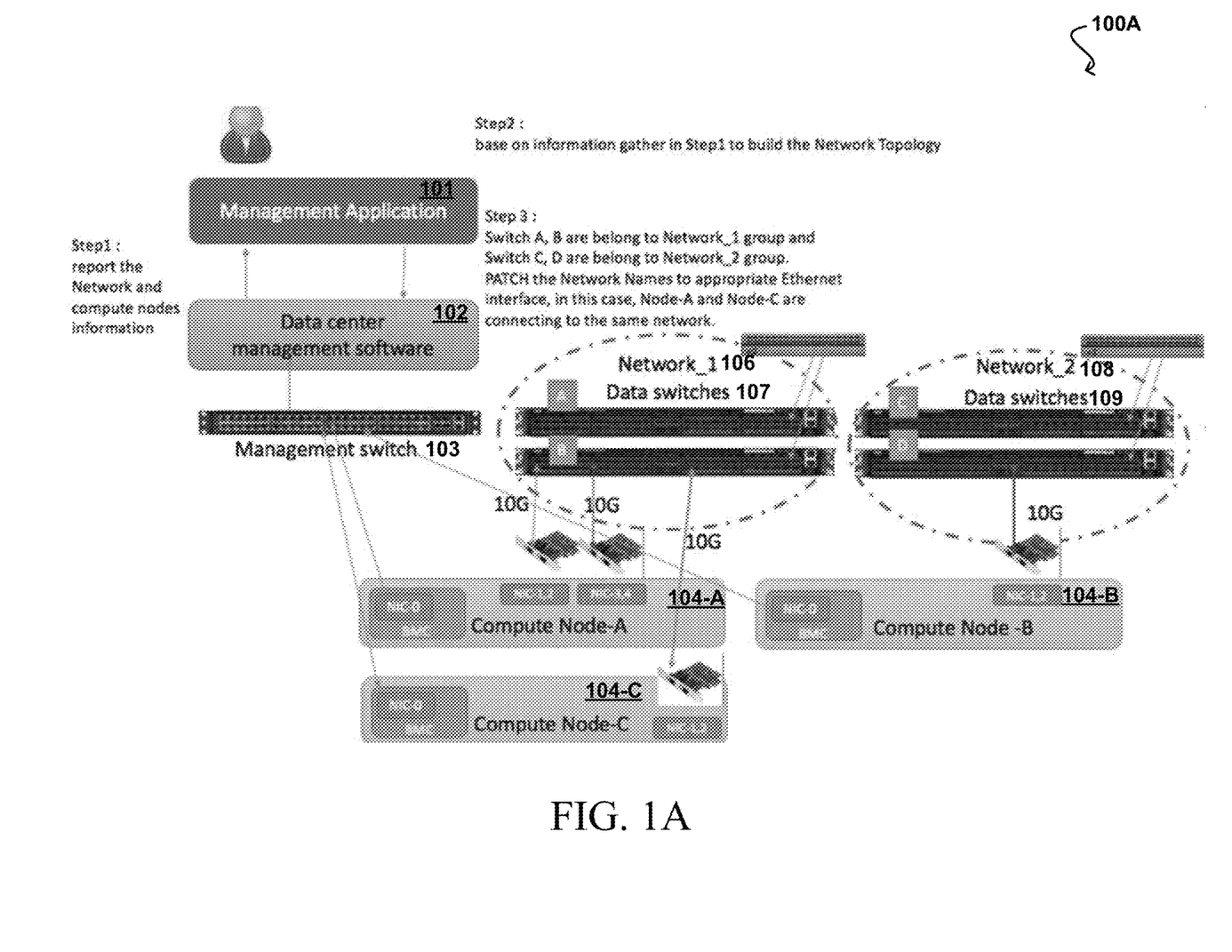
FIGS. 1A-1C are schematic block diagrams illustrating an exemplary data center capable of composing suitable resources for a user request, in accordance with some implementations of the present disclosure.

FIG. 1A is a schematic block diagram illustrating an exemplary data center 100A capable of composing suitable nodes within a network group in response to receiving a user request, in accordance with some implementations of the present disclosure. In this example, the data center 100A includes a management application 101, a data center management software 102, a management switch 103, a plurality of nodes (e.g., 104-A, 104-B and 104-C), and a plurality of switches (e.g., data switches 107 and data switches 109). The data center management software 102 can use a compose algorithm to check Ethernet interface capability of the plurality of nodes (e.g., 104-A, 104-B and 104-C), and the plurality of switches (e.g., data switches 107 and data switches 109) via the management switch 103.

In this example, the management application 101 communicates with the data center management software 102, and causes the management software 102 to collect connection status between the plurality of nodes (e.g., 104-A, 104-B, and 104-C) and the plurality of switches (e.g., 107 and 109), and connection status among the plurality of switches (e.g., 107 and 109). Subsequently, the management application 101 can receive the connection status from the data center management software 102, and generate a network topology of the data center 100A, based upon the connection status.

In FIG. 1A, the management application 101 can further patch a network name for each Ethernet interface of the plurality of nodes 104-A, 104-B, and 104-C. A specific Ethernet interface of the plurality of nodes 104-A, 104-B, and 104-C is patched with a name of a corresponding network connected to the specific Ethernet interface.

In this example, switches 107 (e.g., data switches A and B) belong to a Network_1 106, while switches 109 (e.g., data switches C and D) belong to a Network_2 108. NIC-1 and NIC-3 of the node 104-A are connected to the switches 107 (i.e., data switch B). NIC-1 of the node 104-C is connected to the switches 107 (i.e., data switch B). NIC-1 of the node 104-B is connected to the switches 109 (i.e., data switch D). Thus, Ethernet interfaces of the nodes 104-A and 104-C can be patched with a name of the Network_1 106, while Ethernet interfaces of the node 104-B can be patched with a name of the Network_1 108.

Based upon the network name patched to each Ethernet interface of the plurality of nodes 104-A, 104-B, and 104-C, the management application 101 can determine matched nodes among the plurality of nodes 104-A, 104-B, and 104-C. For example, Ethernet interfaces of the nodes 104-A and 104-C are all patched with the name of the Network_1 106. Therefore, the management application 101 can determine that the nodes 104-A and 104-C belong to the same Network_1 106, and are matched nodes.

Figure 1B:
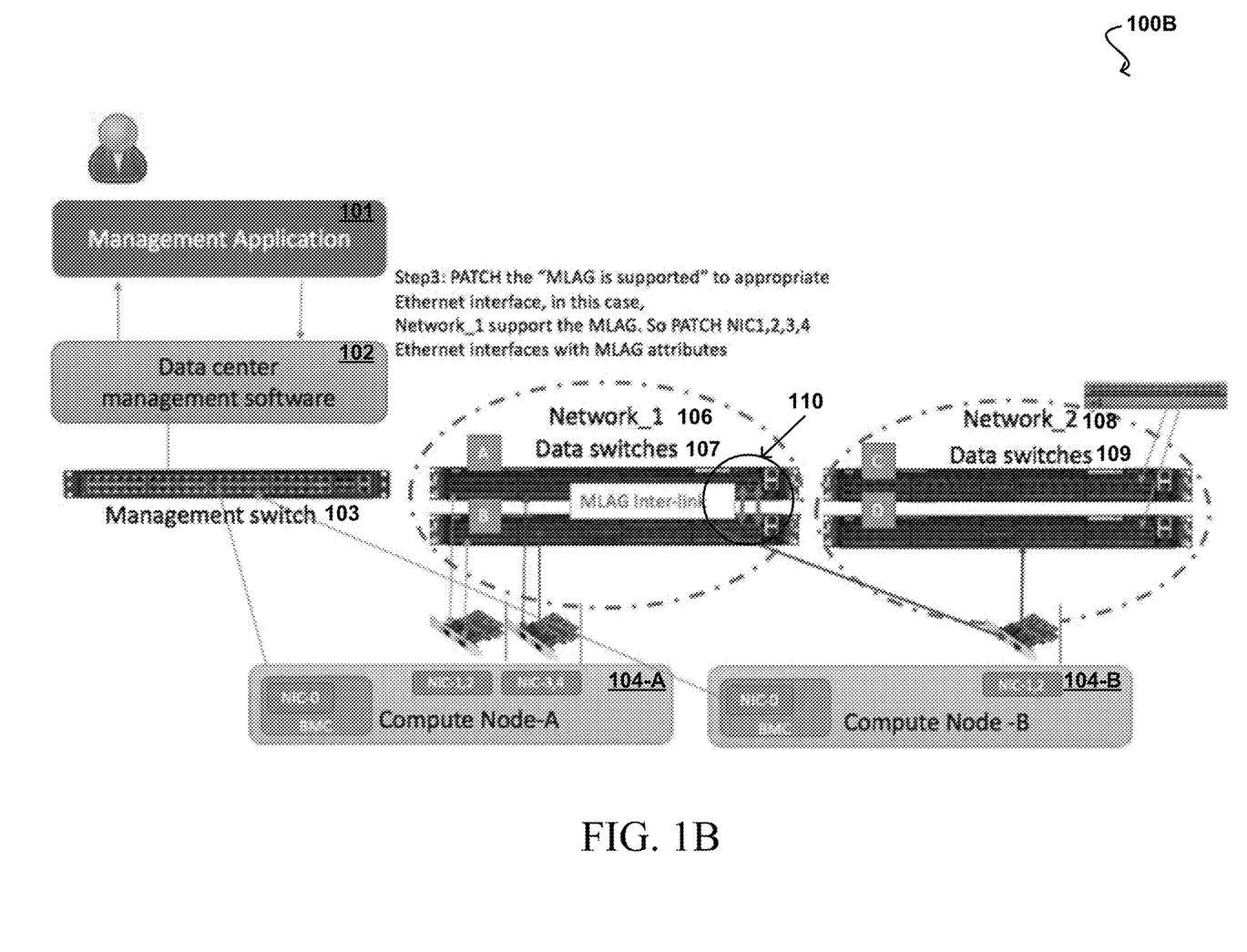

FIG. 1B is a schematic block diagram illustrating an exemplary data center 100B capable of composing at least one node supporting MLAG functionality, in accordance with some implementations of the present disclosure. In this example, the data center 100B includes a management application 101, a data center management software 102, a management switch 103, a plurality of nodes (e.g., 104-A and 104-B), and a plurality of switches (e.g., 107 and 109).

In this example, the management application 101 communicates with the data center management software 102, and causes the management software 102 to collect connection status between the plurality of nodes (e.g., 104-A and 104-B) and the plurality of switches (e.g., 107 and 109), and connection status among the plurality of switches (e.g., 107 and 109). Subsequently, the management application 101 can receive the connection status from the data center management software 102, and generate a network topology of the data center 100B, as illustrated in FIG. 1B, based upon the connection status.

The management application 101 can further determine two or more Ethernet interfaces of at least one node (e.g., node 104-A) that support MLAG (Multi-Chassis Link Aggregation Group) functionality. In this example, NIC-1 of the node 104-A is connected to data switch A while NIC-2 of the node 104-A is connected to data switch B. Also, NIC-3 of the node 104-A is connected to data switch A while NIC-4 of the node 104-A is connected to data switch B. There are established MLAG inter-links 110 between data switches A and B. The management application 101 can update NIC-1, NIC-2, NIC-3 and NIC-4 of the node 104-A as "Supporting MLAG." In some implementations, the management application 101 can update NIC-1, NIC-2, NIC-3 and NIC-4 of the node 104-A as "Supporting MLAG" via a HTTP (Hypertext Transfer Protocol) patch. For example, the management application 101 can patch NIC-1, NIC-2, NIC-3 and NIC-4 of the node 104-A with MLAG attributes.

Figure 1C:
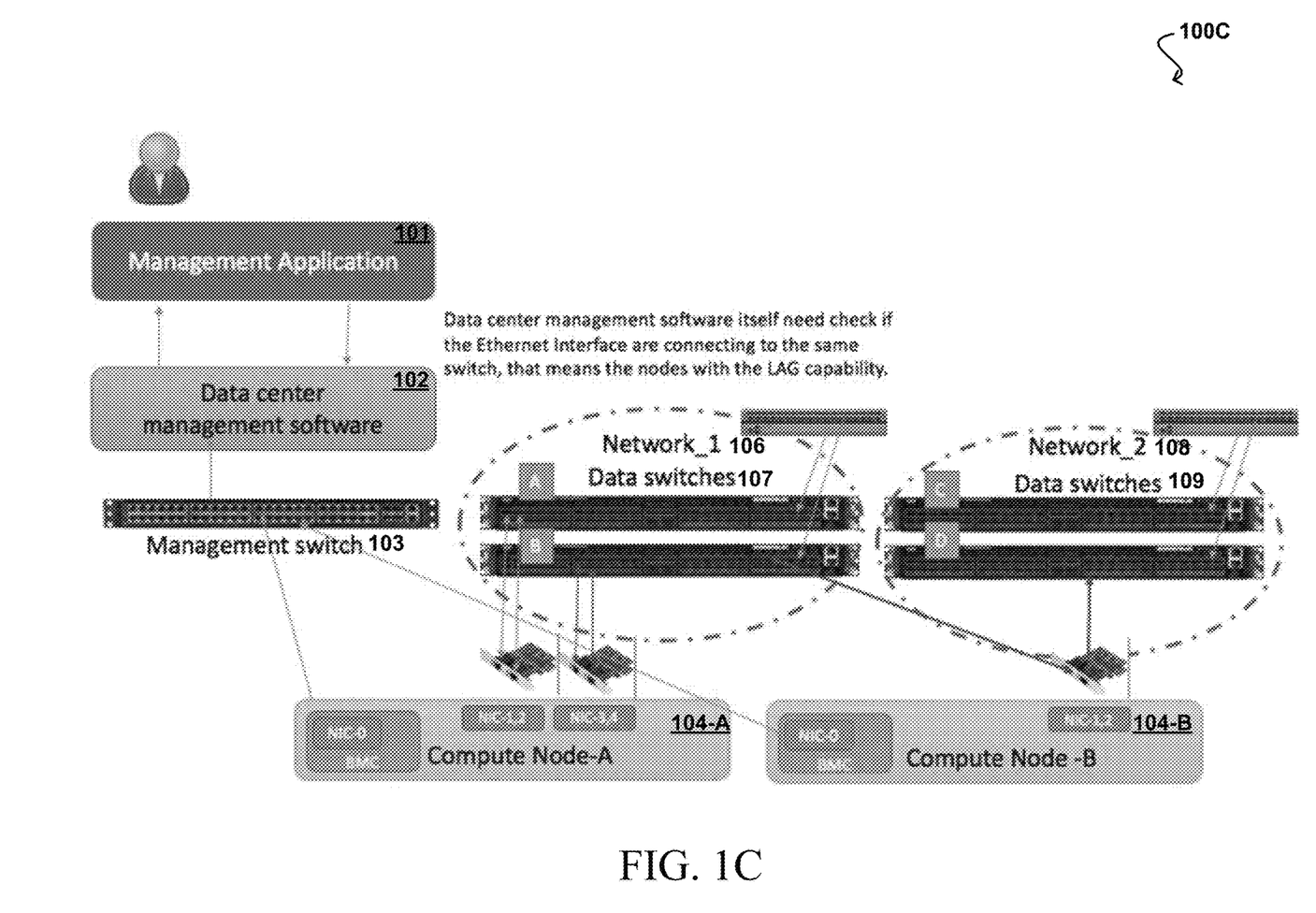

FIG. 1C is a schematic block diagram illustrating an exemplary data center 100C capable of composing nodes supporting LAG functionality, in accordance with some implementations of the present disclosure. In this example, the data center 100C includes a management application 101, a data center management software 102, a management switch 103, a plurality of nodes (e.g., 104-A and 104-B), and a plurality of switches (e.g., 107 and 109).

In this example, the management application 101 communicates with the data center management software 102, and causes the management software 102 to collect connection status between the plurality of nodes (e.g., 104-A and 104-B) and the plurality of switches (e.g., 107 and 109), and connection status among the plurality of switches (e.g., 107 and 109). Subsequently, the management application 101 can receive the connection status from the data center management software 102, and generate a network topology of the data center 100C, as illustrated in FIG. 1C, based upon the connection status.

The management application 101 can patch a network name for each Ethernet interface of the plurality of nodes (e.g., 104-A and 104-B), in which a specific Ethernet interface of the plurality of nodes (e.g., 104-A and 104-B) is patched with a name of a corresponding network connected to the specific Ethernet interface. NIC-1,2 of the node 104-A are connected to the data switch A of the Network_1 106, while NIC-3,4 of the node 104-A are connected to the data switch B of the Network_1 106, respectively. NIC-1,2 of the node 104-B is connected to the data switch B of the Network_1 106 and the data switch D of the Network_2 108, respectively. Thus, Ethernet interfaces of the node 104-A can be patched with a name of the Network_1 106, while Ethernet interfaces of the node 104-B can be patched with names of the Network_1 108 and the Network_1 106.

The management application 101 can further determine two or more Ethernet interfaces of at least one node that support MLAG (Multi-Chassis Link Aggregation Group) functionality. In this example, there is no shown node supporting the MLAG functionality.

The management application 101 or the data center management software 102 can further determine two or more Ethernet interfaces of at least one node (e.g., node 104-A) that support LAG functionality. In this example, NIC-1 of the node 104-A is connected to data switch A while NIC-2 of the node 104-A is also connected to data switch A. In addition, NIC-3 of the node 104-A is connected to data switch B while NIC-4 of the node 104-A is also connected to data switch B. On the other hand, NIC-1 and NIC-2 of the node 104-B are connected to different switches. Thus, NIC-1, NIC-2, NIC-3 and NIC-4 of the node 104-A support the LAG functionality, while NIC-1 and NIC-2 of the node 104-B do not support the LAG functionality.

In some implementations, the management application 101 can update NIC-1, NIC-2, NIC-3 and NIC-4 of the node 104-A as "Supporting LAG" via a HTTP (Hypertext Transfer Protocol) patch. For example, the management application 101 can patch NIC-1, NIC-2, NIC-3 and NIC-4 of the node 104-A with LAG attributes.

Although only certain components are shown within the exemplary systems 100A-100C in FIGS. 1A-1C, various types of electronic or computing components that are capable of processing or storing data, receiving or transmitting signals, or providing fresh air to downstream components, can also be included in the exemplary systems 100A-100B. Further, the electronic or computing components in the exemplary systems 100A-100B can be configured to execute various types of application, and/or can use various types of operating systems. These operating systems can include, but are not limited to, Android, BSD (Berkeley Software Distribution), iOS (iPhone OS), Linux, OS X, Unix-like Real-time Operating System (e.g., QNX), Microsoft Windows, Window Phone, and IBM z/OS.

Depending on the desired implementation for the exemplary systems 100A-100B, a variety of networking and messaging protocols can be used, including but not limited to, TCP/IP, OSI (open systems interconnection), FTP (file transfer protocol), UpnP (universal plug and play), NFS (network file system), CIFS (common internet file system), AppleTalk etc. As would be appreciated by those skilled in the art, the exemplary systems 100A-100B illustrated in FIGS. 1A-1C, are used for purposes of explanation. Therefore, a network system can be implemented with many variations as appropriate, and yet still provide a configuration of a network platform in accordance with various examples of the present disclosure.

In exemplary configurations of FIGS. 1A-1C, the exemplary systems 100A-100B can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well, within the scope of various examples.

The above discussion is meant to be illustrative of the principles and various examples of the present disclosure. Numerous variations and modifications will become apparent once the above disclosure is fully appreciated.

Figure 2A:
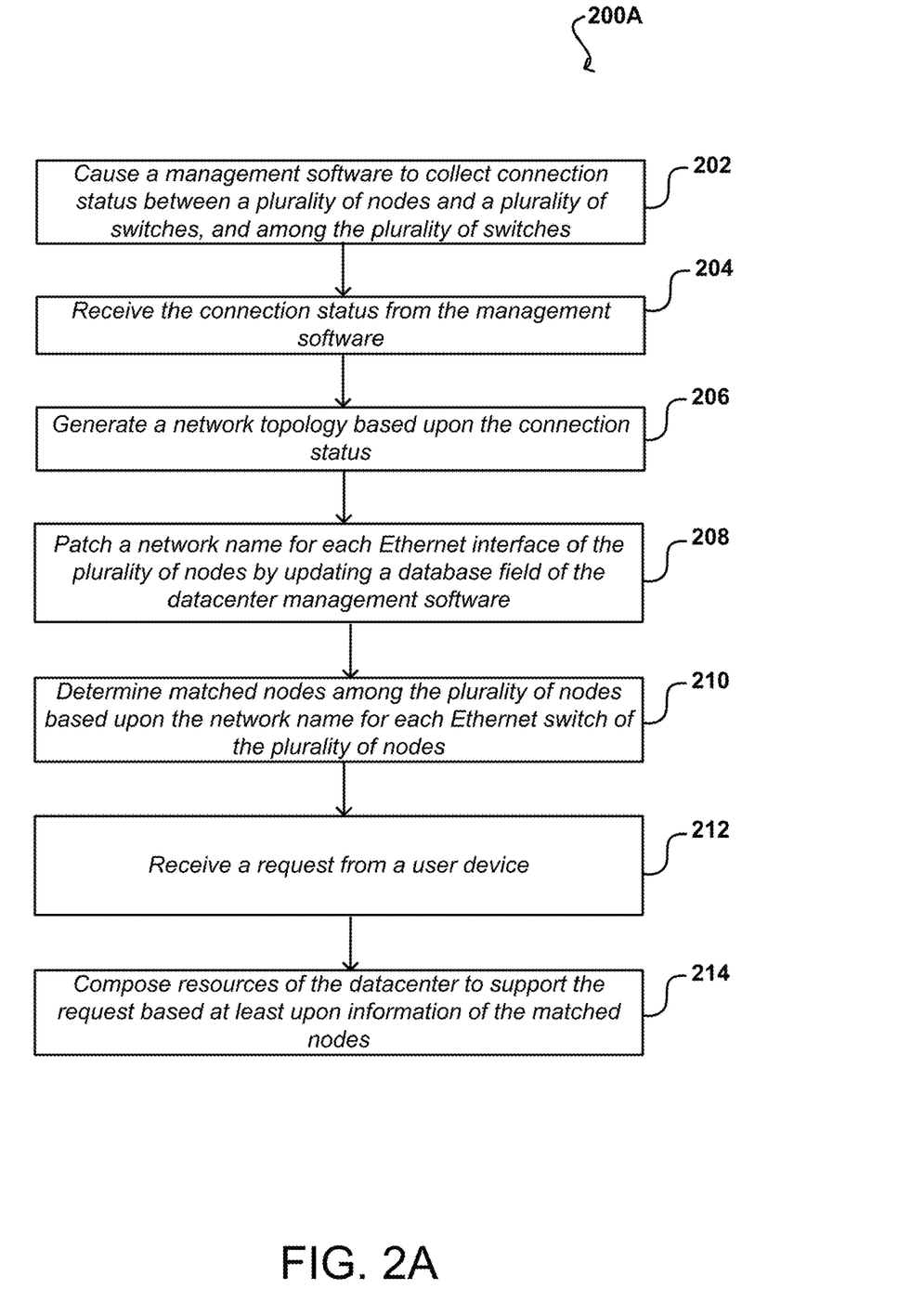
FIGS. 2A-2C are exemplary methods for automatically composing data center resources in a data center, in accordance with an implementation of the present disclosure.

FIG. 2A is an exemplary method 200A for automatically composing data center resources in a data center, in accordance with an implementation of the present disclosure. It should be understood that the exemplary method 200A is presented solely for illustrative purposes, and that in other methods in accordance with the present disclosure can include additional, fewer, or alternative steps performed in similar or alternative orders, or in parallel. The exemplary method 200A starts at step 202 by collecting connection status between a plurality of nodes and a plurality of switches in the data center, as well as connection status among the plurality of switches, as illustrated in FIGS. 1A, 1B, and 1C. In some examples, data center management software can automatically collect the connection status in the data center. In some examples, a management application can cause the data center management software to collect the connection status in the data center.

At step 204, the management application can receive the connection status from the data center management software. At step 206, based upon the connection status, the management application can generate a network topology of the data center, as illustrated in FIGS. 1A, 1B, and 1C.

At step 208, the management application can patch a network name for each Ethernet interface of the plurality of nodes. In some examples, a specific Ethernet interface of the plurality of nodes can be patched with a name of a corresponding network connected to the specific Ethernet interface, as illustrated in FIG. 1A.

At step 210, the management application can determine matched nodes among the plurality of nodes based upon the network name patched to each Ethernet interface of the plurality of nodes, as illustrated in FIG. 1A. The matched nodes belong to a same network work in the datacenter. At step 212, the management application receives a request from a user device of a user. At step 214, the management application can compose resources of the data center to support the request based at least upon information of the matched nodes.

In some examples, the computer-implemented method 200A further comprises: determining that the request has been satisfied; and decomposing the resources such that the resources are accessible for other users.

In some examples, the step of patching a network name for each Ethernet interface of the plurality of nodes includes a step of updating a database field of the management software.

Figure 2B:
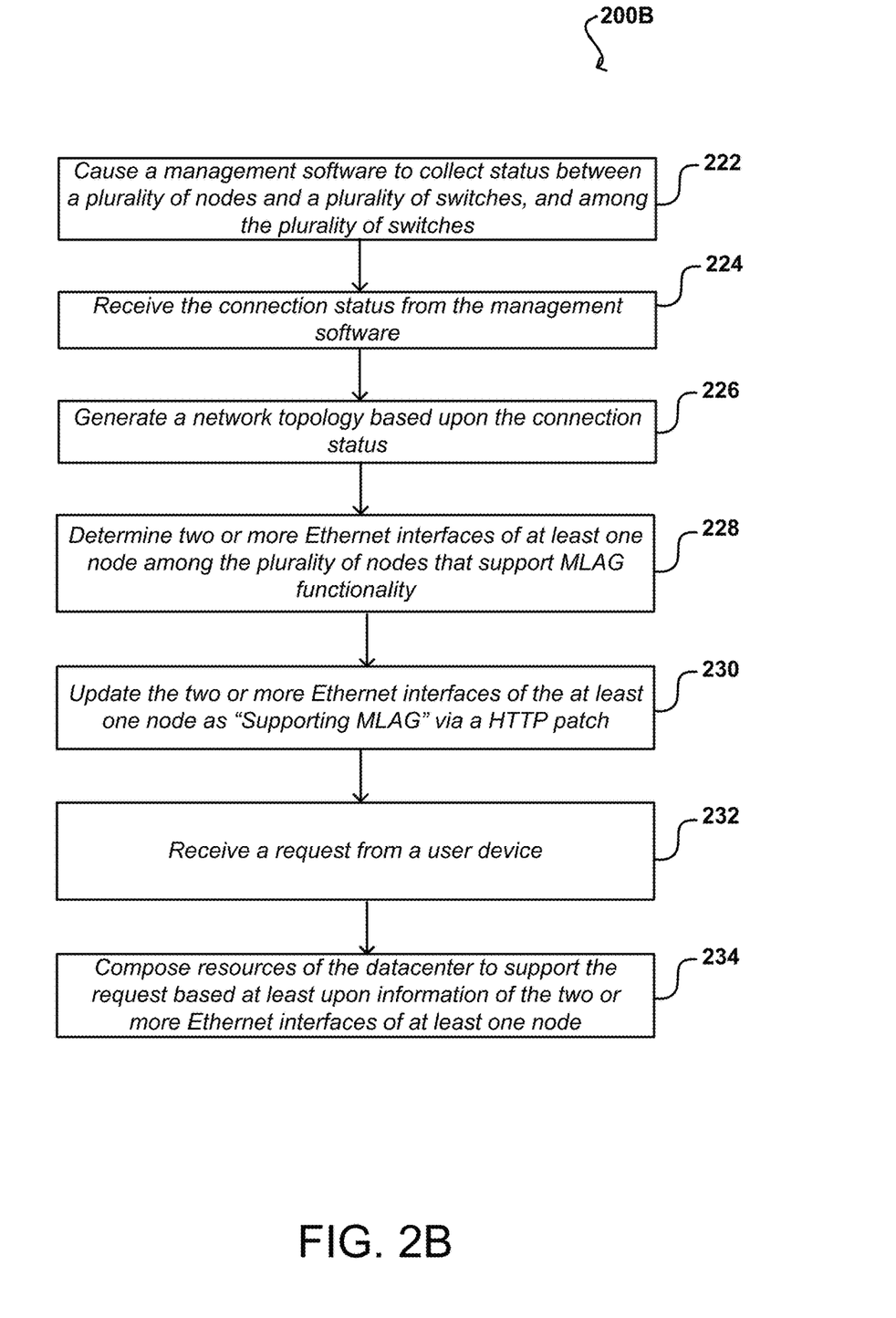

FIG. 2B is an exemplary method 200B for automatically composing data center resources in a data center, in accordance with an implementation of the present disclosure. The exemplary method 200B starts at step 222 by collecting connection status between a plurality of nodes and a plurality of switches in the data center, and connection status among the plurality of switches, as illustrated in FIGS. 1A, 1B, and 1C.

At step 224, a management application can receive the connection status from data center management software in the data center. At step 226, based upon the connection status, the management application can generate a network topology of the data center, as illustrated in FIGS. 1A, 1B, and 1C.

At step 228, the management application can determine two or more Ethernet interfaces of at least one node among the plurality of nodes that support MLAG (Multi-Chassis Link Aggregation Group) functionality, as illustrated in FIG. 1B. At step 230, the management application can further update the two or more Ethernet interfaces of at least one node as "Supporting MLAG," as illustrated in FIG. 1B.

At step 232, the management application receives a request from a user device of a user. At step 234, the management application can compose resources of the data center to support the request based at least upon information of the two or more Ethernet interfaces of the at least one node.

In some examples, the two or more Ethernet interfaces of the at least one node are updated as "Supporting MLAG" via a HTTP (Hypertext Transfer Protocol) patch.

Figure 2C:
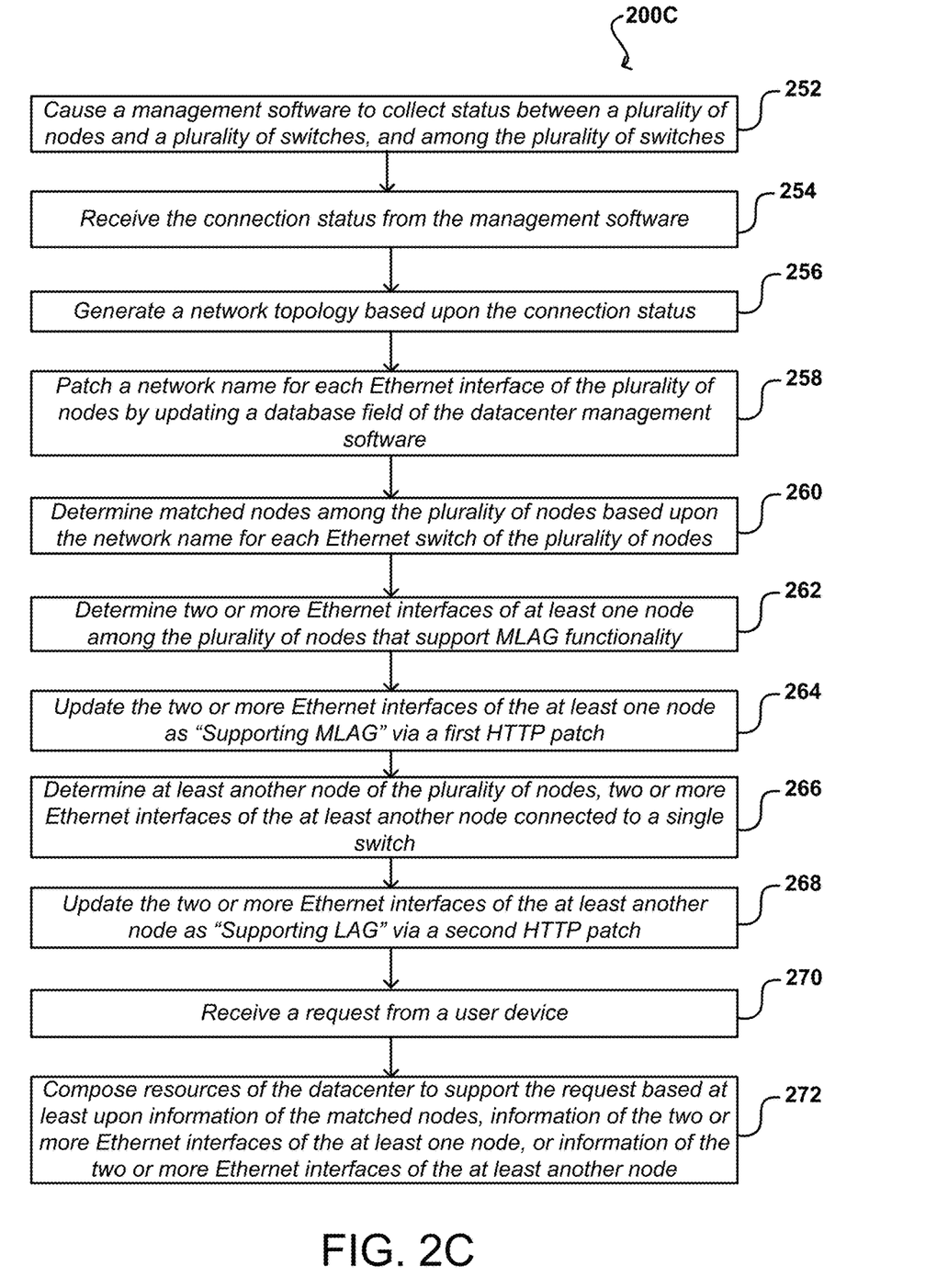

FIG. 2C is an exemplary method 200C for automatically composing data center resources in a data center, in accordance with an implementation of the present disclosure. The exemplary method 200C starts at step 252 by collecting connection status between a plurality of nodes and a plurality of switches in the data center, and connection status among the plurality of switches, as illustrated in FIGS. 1A, 1B, and 1C. At step 254, a management application can receive the connection status from data center management software in the data center. At step 256, based upon the connection status, the management application can generate a network topology of the data center, as illustrated in FIGS. 1A, 1B, and 1C.

At step 258, the management application can patch a network name for each Ethernet interface of the plurality of nodes. In some examples, a specific Ethernet interface of the plurality of nodes can be patched with a name of a corresponding network connected to the specific Ethernet interface, as illustrated in FIG. 1A. At step 260, the management application can determine matched nodes among the plurality of nodes based upon the network name patched to each Ethernet interface of the plurality of nodes, as illustrated in FIG. 1A.

At step 262, the management application can determine two or more Ethernet interfaces of at least one node among the plurality of nodes that support MLAG functionality, as illustrated in FIG. 1B. At step 264, the management application can further update the two or more Ethernet interfaces of at least one node as "Supporting MLAG," as illustrated in FIG. 1B.

At step 266, the management application can determine at least another node of the plurality of nodes. Two or more Ethernet interfaces of the at least another node are connected to a single switch of the plurality of switches. At step 268, the management application can update the two or more Ethernet interfaces of the at least another node as "Supporting LAG (Link Aggregation Group)."

At step 270, the management application receives a request from a user device of a user. At step 272, the management application can compose resources of the data center to support the request based at least upon based at least upon information of the matched nodes, information of the two or more Ethernet interfaces of the at least node, or information of the two or more Ethernet interfaces of the at least another node.

In some examples, the computer-implemented method 200C for composing data center resources in the data center further comprises the step of: composing the resources of the data center to support the request based at least upon network attributes including DCB (Data center Bridging).

Figure 3:
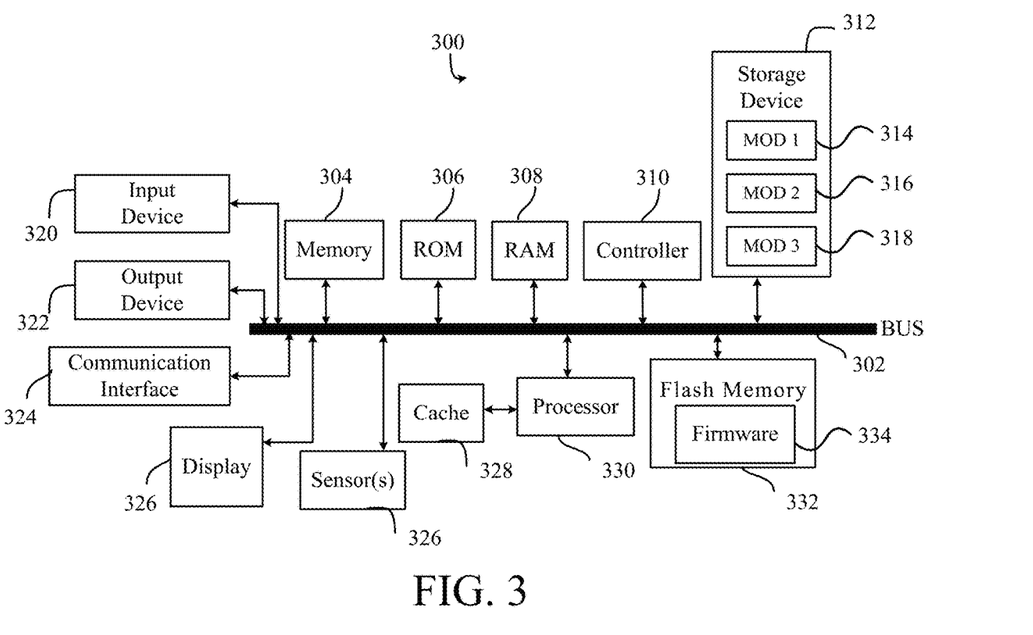
FIGS. 3 and 4 illustrate exemplary systems in accordance with various examples of the present disclosure.
Figure 4:
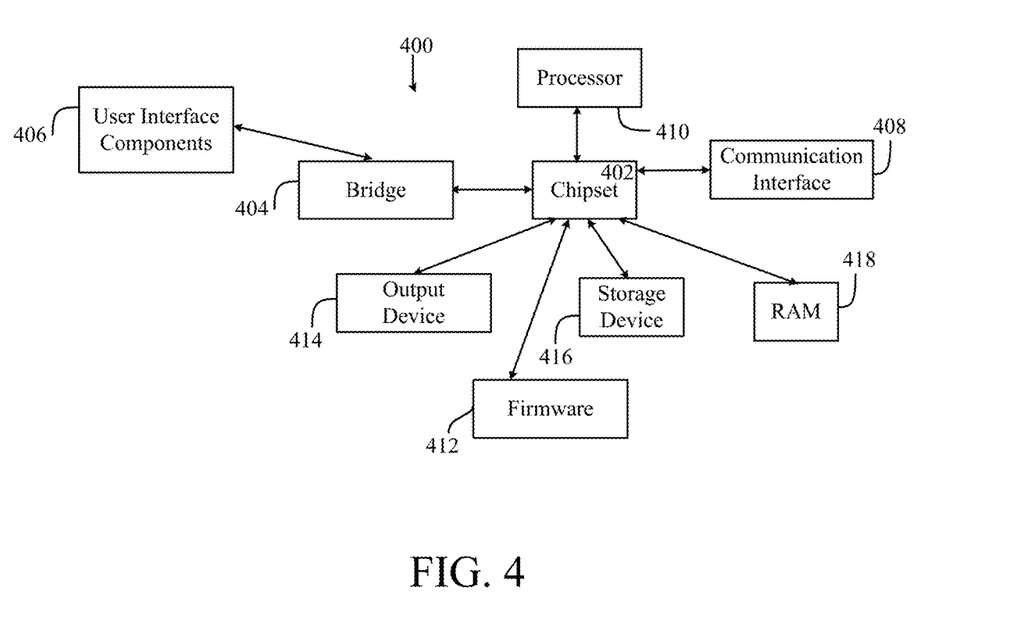

A brief introductory description of example systems and networks, as illustrated in FIGS. 3-4, is disclosed herein. These variations shall be described herein as the various examples are set forth. The present disclosure now turns to FIG. 3.

FIG. 3 illustrates an example computing system 300, in which components of the computing system are in electrical communication with each other using a bus 302. The system 300 includes a processing unit (CPU or processor) 330, and a system bus 302 that couples various system components, including the system memory 404 (e.g., read only memory (ROM) 306 and random access memory (RAM) 308), to the processor 330. The system 300 can include a cache of high-speed memory connected directly with, in close proximity to, or integrated as part of the processor 330. The system 300 can copy data from the memory 304 and/or the storage device 312 to the cache 328 for quick access by the processor 330. In this way, the cache can provide a performance boost for processor 330 while waiting for data. These and other modules can control or be configured to control the processor 330 to perform various actions. Other system memory 304 may be available for use as well. The memory 304 can include multiple different types of memory with different performance characteristics. The processor 330 can include any general purpose processor and a hardware module or software module, such as module 1 314, module 2 316, and module 3 318 embedded in storage device 312. The hardware module or software module is configured to control the processor 330, as well as a special-purpose processor where software instructions are incorporated into the actual processor design. The processor 330 may essentially be a completely self-contained computing system, and containing multiple cores or processors, a bus, memory controller, cache, etc. A multi-core processor may be symmetric or asymmetric.

To enable user interaction with the computing device 300, an input device 320 is provided as an input mechanism. The input device 320 can comprise a microphone for speech, a touch-sensitive screen for gesture or graphical input, keyboard, mouse, motion input, and so forth. In some instances, multimodal systems can enable a user to provide multiple types of input to communicate with the system 300. In this example, an output device 322 is also provided. The communications interface 324 can govern and manage the user input and system output.

Storage device 312 can be a non-volatile memory to store data that are accessible by a computer. The storage device 312 can be magnetic cassettes, flash memory cards, solid state memory devices, digital versatile disks, cartridges, random access memories (RAMs) 308, read only memory (ROM) 306, and hybrids thereof.

The controller 310 can be a specialized microcontroller or processor on the system 300, such as a BMC (baseboard management controller). In some cases, the controller 310 can be part of an (IPMI). Moreover, in some cases, the controller 310 can be embedded on a motherboard or main circuit board of the system 300. The controller 310 can manage the interface between system management software and platform hardware. The controller 310 can also communicate with various system devices and components (internal and/or external), such as controllers or peripheral components, as further described below.

The controller 310 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 310 to initiate or conduct specific hardware recovery procedures or operations, as further described below.

The controller 310 can also include a system event log controller and/or storage for managing and maintaining events, alerts, and notifications received by the controller 310. For example, the controller 310 or a system event log controller can receive alerts or notifications from one or more devices and components, and maintain the alerts or notifications in a system event log storage component.

Flash memory 332 can be an electronic non-volatile computer storage medium or chip that can be used by the system 300 for storage and/or data transfer. The flash memory 332 can be electrically erased and/or reprogrammed. Flash memory 332 can include EPROM (erasable programmable read-only memory), EEPROM (electrically erasable programmable read-only memory), ROM, NVRAM, or CMOS (complementary metal-oxide semiconductor), for example. The flash memory 332 can store the firmware 334 executed by the system 300, when the system 300 is first powered on, along with a set of configurations specified for the firmware 334. The flash memory 332 can also store configurations used by the firmware 334.

The firmware 334 can include a Basic Input/Output System or equivalents, such as an EFI (Extensible Firmware Interface) or UEFI (Unified Extensible Firmware Interface). The firmware 334 can be loaded and executed as a sequence program each time the system 300 is started. The firmware 334 can recognize, initialize, and test hardware present in the system 300 based on the set of configurations. The firmware 334 can perform a self-test, such as a POST (Power-on-Self-Test), on the system 300. This self-test can test functionality of various hardware components such as hard disk drives, optical reading devices, cooling devices, memory modules, expansion cards, and the like. The firmware 334 can address and allocate an area in the memory 304, ROM 306, RAM 308, and/or storage device 312, to store an operating system (OS). The firmware 334 can load a boot loader and/or OS, and give control of the system 300 to the OS.

The firmware 334 of the system 300 can include a firmware configuration that defines how the firmware 334 controls various hardware components in the system 300. The firmware configuration can determine the order in which the various hardware components in the system 300 are started. The firmware 334 can provide an interface, such as an UEFI, that allows a variety of different parameters to be set, which can be different from parameters in a firmware default configuration. For example, a user (e.g., an administrator) can use the firmware 334 to specify clock and bus speeds; define what peripherals are attached to the system 300; set monitoring of health (e.g., fan speeds and CPU temperature limits); and/or provide a variety of other parameters that affect overall performance and power usage of the system 300. While firmware 334 is illustrated as being stored in the flash memory 332, one of ordinary skill in the art will readily recognize that the firmware 334 can be stored in other memory components, such as memory 304 or ROM 306.

System 300 can include one or more sensors 326. The one or more sensors 326 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 326 can communicate with the processor, cache 328, flash memory 332, communications interface 324, memory 304, ROM 306, RAM 308, controller 310, and storage device 312, via the bus 302, for example. The one or more sensors 326 can also communicate with other components in the system via one or more different means, such as inter-integrated circuit (I2C), general purpose output (GPO), and the like. Different types of sensors (e.g., sensors 326) on the system 300 can also report to the controller 310 on parameters, such as cooling fan speeds, power status, operating system (OS) status, hardware status, and so forth.

FIG. 4 illustrates an example computer system 400 having a chipset architecture that can be used in executing the described method(s) or operations, and in generating and displaying a graphical user interface (GUI). Computer system 400 can include computer hardware, software, and firmware that can be used to implement the disclosed technology. System 400 can include a processor 410, representative of a variety of physically and/or logically distinct resources capable of executing software, firmware, and hardware configured to perform identified computations. Processor 410 can communicate with a chipset 402 that can control input to and output from processor 410. In this example, chipset 402 outputs information to output device 414, such as a display, and can read and write information to storage device 416, which can include magnetic media, and solid state media, for example. Chipset 402 can also read data from and write data to RAM 418. A bridge 404 for interfacing with a variety of user interface components 406, can be provided for interfacing with chipset 402. Such user interface components 406 can include a keyboard, a microphone, touch detection and processing circuitry, a pointing device, such as a mouse, and so on. In general, inputs to system 400 can come from any of a variety of sources, machine generated and/or human generated.

Chipset 402 can also interface with one or more communication interfaces 408 that can have different physical interfaces. Such communication interfaces can include interfaces for wired and wireless local area networks, for broadband wireless networks, and for personal area networks. Further, the machine can receive inputs from a user via user interface components 406 and execute appropriate functions, such as browsing functions by interpreting these inputs using processor 410.

Moreover, chipset 402 can also communicate with firmware 412, which can be executed by the computer system 400 when powering on. The firmware 412 can recognize, initialize, and test hardware present in the computer system 400 based on a set of firmware configurations. The firmware 412 can perform a self-test, such as a POST, on the system 400. The self-test can test the functionality of the various hardware components 402-418. The firmware 412 can address and allocate an area in the memory 418 to store an OS. The firmware 412 can load a boot loader and/or OS, and give control of the system 400 to the OS. In some cases, the firmware 412 can communicate with the hardware components 402-410 and 414-418. Here, the firmware 412 can communicate with the hardware components 402-410 and 414-418 through the chipset 402, and/or through one or more other components. In some cases, the firmware 412 can communicate directly with the hardware components 402-410 and 414-418.

It can be appreciated that example systems 300 and 400 can have more than one processor (e.g., 330, 410), or be part of a group or cluster of computing devices networked together to provide greater processing capability.

For clarity of explanation, in some instances, the present disclosure may be presented as including individual functional blocks including functional blocks, including devices, device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used, can be accessible over a network. The computer executable instructions may be, for example, binaries and intermediate format instructions, such as assembly language, firmware, or source code.

Devices implementing methods according to these disclosures can include hardware, firmware and/or software, and can take any of a variety of form factors. Typical examples of such form factors include laptops, smart phones, small form factor personal computers, personal digital assistants, rack-mount devices, standalone devices, and so on. Functionality described herein also can be embodied in peripherals or add-in cards. Such functionality can also be implemented on a circuit board among different chips, or different processes executing in a single device, by way of further example.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless, and handheld devices running mobile software, and capable of supporting a number of networking and messaging protocols. Such a system can also include a number of workstations running any of a variety of commercially-available operating systems, and other known applications for purposes such as development and database management. These devices can also include other electronic devices, such as dummy terminals, thin-clients, gaming systems, and other devices capable of communicating via a network.

To the extent examples, or portions thereof, are implemented in hardware, the present disclosure can be implemented with any, or a combination of, the following technologies: a discrete logic circuit(s) having logic gates for implementing logic functions upon data signals; an application specific integrated circuit (ASIC) having appropriate combinational logic gates; programmable hardware such as a programmable gate array(s) (PGA); and/or a field programmable gate array (FPGA); etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network, and any combination thereof.

Devices implementing methods, according to these technologies, can include hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips, or different processes executing in a single device, by way of further example.

In examples that utilize a Web server, the Web server can run any variety of server or mid-tier applications, including HTTP servers, FTP servers, CGI servers, data servers, Java servers, and business application servers. In response to requests from user devices, the Web server(s) can also be capable of executing programs or scripts. For example, the Web server can execute one or more Web applications, which can be implemented as one or more scripts or programs written in any programming language, such as Java®, C, C# or C++ or any scripting language, such as Perl, Python or TCL, as well as combinations thereof. The Web server(s) can also encompass database servers, including those commercially available on the open market.

The server system can include a variety of data stores and other memory and storage media, as discussed above. These can reside in a variety of locations, such as on a storage medium local to (and/or resident in) one or more of the computers, or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad), and at least one output device (e.g., a display device, printer or speaker). Such a system can also include one or more storage devices, such as disk drives, optical storage devices, and solid-state storage devices such as random access memory (RAM) or read-only memory (ROM), as well as removable media devices, memory cards, flash cards, etc.

Storage media and computer readable media for containing code, or portions of code, can include any appropriate media known or used in the art, including storage media and computing media. The storage media and computing media can include, but are not limited to, removable and non-removable media for storage and/or transmission of data or information. The removable and non-removable media comprise RAM, ROM, EPROM, EEPROM, flash memory or other memory technology, CD-ROM, digital versatile disk (DVD) or other optical storage, magnetic cassettes, magnetic tape, magnetic disk storage, or other magnetic storage devices that can be used to store the desired information and that can be accessed by a system device. The data or information can include computer readable instructions, data structures, program modules, or other data. Based on the technology and teachings provided herein, a person of ordinary skill in the art will appreciate other ways and/or methods to implement the various aspects of the present disclosure.

The specification and drawings are, accordingly, to be regarded in an illustrative rather than a restrictive sense. It will, however, be evident that various modifications and changes can be made thereunto without departing from the broader spirit and scope of the patent application, as set forth in the claims.

What is claimed is:

1. A computer-implemented method for automatically composing data center resources in a data center, comprising:
    causing a management software of the data center to collect connection status between a plurality of nodes and a plurality of switches in the data center, and among the plurality of switches;
    receiving the connection status from the management software;
    generating a network topology of the data center based upon the connection status;
    patching a network name for each Ethernet interface of the plurality of nodes, wherein a specific Ethernet interface of the plurality of nodes is patched with a name of a corresponding network connected to the specific Ethernet interface;
    determining matched nodes among the plurality of nodes based upon the network name patched to each Ethernet interface of the plurality of nodes;
    determining at least one Ethernet interface of at least one node among the plurality of nodes that supports a networking attribute, wherein the networking attribute consists of at least one of MLAG (Multi-Chassis Link Aggregation Group) functionality, DCB (Data center Bridging) functionality, and LAG (Link Aggregation Group) functionality;
    updating the at least one Ethernet interface of the at least one node as "Supporting MLAG," "Supporting DCB," or "Supporting LAG" based on the networking attribute;
    receiving a request from a user device of a user; and
    composing resources of the data center to support the request based at least upon information of the matched nodes, wherein the resources comprise the at least one Ethernet interface, and wherein the at least one Ethernet interface is selected because the at least one Ethernet interface supports the networking attribute.

2. The computer-implemented method of claim 1, further comprising:
    determining that the request has been satisfied; and
    decomposing the resources such that the resources are accessible for other users.

3. The computer-implemented method of claim 1, wherein patching a network name for each Ethernet interface of the plurality of nodes further comprises updating a database field of the management software.

4. The computer-implemented method of claim 1, wherein the networking attribute is MLAG and wherein the at least one Ethernet interfaces comprises two or more Ethernet interfaces.

5. The computer-implemented method of claim 4, wherein the resources of the data center are composed to support the request based at least upon information of the two or more Ethernet interfaces of the at least one node.

6. The computer-implemented method of claim 4, wherein the two or more Ethernet interfaces of the at least one node are updated as "Supporting MLAG" via a first HTTP (Hypertext Transfer Protocol) patch.

7. The computer-implemented method of claim 4, further comprising:
    determining at least another node of the plurality of nodes, two or more Ethernet interfaces of the at least another node connected to a single switch of the plurality of switches; and
    updating the two or more Ethernet interfaces of the at least another node as "Supporting LAG (Link Aggregation Group)."

8. The computer-implemented method of claim 7, wherein the resources of the data center is composed to support the request based at least upon information of the two or more Ethernet interfaces of the at least another node.

9. The computer-implemented method of claim 1, wherein the networking attribute is DCB.

10. The computer-implemented method of claim 7, wherein the two or more Ethernet interfaces of the at least another node are updated as "Supporting LAG" via a second HTTP patch.

11. A system for automatically composing data center resources in a data center, comprising:
    a processor; and
    a computer-readable medium storing instructions that, when executed by the processor, cause the system to perform operations comprising:
    causing a management software of the data center to collect connection status between a plurality of nodes and a plurality of switches in the data center, and among the plurality of switches;
    receiving the connection status from the management software;
    generating a network topology of the data center based upon the connection status;
    patching a network name for each Ethernet interface of the plurality of nodes, wherein a specific Ethernet interface of the plurality of nodes is patched with a name of a corresponding network connected to the specific Ethernet interface;
    determining matched nodes among the plurality of nodes based upon the network name patched to each Ethernet interface of the plurality of nodes;
    determining at least one Ethernet interface of at least one node among the plurality of nodes that support a networking attribute, wherein the networking attribute consists of at least one of MLAG (Multi-Chassis Link Aggregation Group) functionality, DCB (Data center Bridging) functionality, and LAG (Link Aggregation Group) functionality;

updating the at least one Ethernet interface of the at least one node as "Supporting MLAG," "Supporting DCB," or "Supporting LAG" based on the networking attribute;

receiving a request from a user device of a user; and composing resources of the data center to support the request based at least upon information of the matched nodes, wherein the resources comprise the at least one Ethernet interface, and wherein the at least one Ethernet interface is selected because the at least one Ethernet interface supports the networking attribute.

12. The system of claim 11, wherein the instructions, when executed by the processor, cause the system to perform operations further comprising:

determining that the request has been satisfied; and decomposing the resources such that the resources are accessible for other users.

13. The system of claim 11, wherein the networking attribute is MLAG and the at least one Ethernet interface comprises two or more Ethernet interfaces.

14. The system of claim 13, wherein the resources of the data center is composed to support the request based at least upon information of the two or more Ethernet interfaces of the at least one node.

15. The system of claim 13, wherein the instructions, when executed by the processor, cause the system to perform operations further comprising:

determining at least another node of the plurality of nodes, two or more Ethernet interfaces of the at least another node connected to a single switch of the plurality of switches; and updating the two or more Ethernet interfaces of the at least another node as "Supporting LAG (Link Aggregation Group)."

16. The system of claim 15, wherein the resources of the data center are composed to support the request based at least upon information of the two or more Ethernet interfaces of the at least another node.

17. The system of claim 11, wherein the networking attribute is DCB.

18. A non-transitory computer-readable storage medium including instructions that, when executed by at least one processor of a system, cause the system to perform operations comprising:

causing a management software of the data center to collect connection status between a plurality of nodes and a plurality of switches in the data center, and among the plurality of switches;

receiving the connection status from the management software;

generating a network topology of the data center based upon the connection status;

patching a network name for each Ethernet interface of the plurality of nodes, wherein a specific Ethernet interface of the plurality of nodes is patched with a name of a corresponding network connected to the specific Ethernet interface;

determining matched nodes among the plurality of nodes based upon the network name patched to each Ethernet interface of the plurality of nodes;

determining at least one Ethernet interface of at least one node among the plurality of nodes that support a networking attribute, wherein the networking attribute consists of at least one of MLAG (Multi-Chassis Link Aggregation Group) functionality, DCB (Data center Bridging) functionality, and LAG (Link Aggregation Group) functionality;

updating the at least one Ethernet interface of the at least one node as "Supporting MLAG," "Supporting DCB," or "Supporting LAG" based on the networking attribute;

receiving a request from a user device of a user; and composing resources of the data center to support the request based at least upon information of the matched nodes, wherein the resources comprise the at least one Ethernet interface, and wherein the at least one Ethernet interface is selected because the at least one Ethernet interface supports the networking attribute.

19. The non-transitory computer-readable storage medium of claim 18, wherein the networking attribute is MLAG and wherein the at least one Ethernet interface comprises two or more Ethernet interfaces.

20. The non-transitory computer-readable storage medium of claim 19, wherein the instructions, when executed, further cause the system to perform operations further comprising:

determining at least another node of the plurality of nodes, two or more Ethernet interfaces of the at least another node connected to a single switch of the plurality of switches; and updating the two or more Ethernet interfaces of the at least another node as "Supporting LAG (Link Aggregation Group)."

* * * * *